(12) United States Patent
Namgung et al.

(10) Patent No.: US 9,946,124 B2
(45) Date of Patent: Apr. 17, 2018

(54) LIQUID CRYSTAL DISPLAY DEVICE

(71) Applicant: Samsung Display Co., Ltd., Yongin, Gyeonggi-do (KR)

(72) Inventors: Wan Namgung, Asan-si (KR); Ik Han Oh, Cheonan-si (KR); Seung Kyu Lee, Cheonan-si (KR); Ho Jun Lee, Asan-si (KR); Ki Pyo Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 49 days.

(21) Appl. No.: 15/058,261

(22) Filed: Mar. 2, 2016

(65) Prior Publication Data

US 2017/0075175 A1 Mar. 16, 2017

(30) Foreign Application Priority Data

Sep. 11, 2015 (KR) ........................ 10-2015-0128706

(51) Int. Cl.
   *G02F 1/1343* (2006.01)
   *G02F 1/1337* (2006.01)
(52) U.S. Cl.
   CPC .. *G02F 1/134336* (2013.01); *G02F 1/133707* (2013.01); *G02F 2001/134345* (2013.01)
(58) Field of Classification Search
   CPC ......... G02F 1/134336; G02F 1/133707; G02F 2001/134345

USPC .................................................. 349/142–146
See application file for complete search history.

(56) References Cited

U.S. PATENT DOCUMENTS

2013/0063686 A1*  3/2013  Tashiro ............. G02F 1/133707
                                                      349/98

FOREIGN PATENT DOCUMENTS

KR   1020150019131 A   2/2015
KR   1020170001812 A   1/2017

* cited by examiner

*Primary Examiner* — Charles Chang
(74) *Attorney, Agent, or Firm* — Cantor Colburn LLP

(57) ABSTRACT

A liquid crystal display includes substrates facing each other, plural pixels, a liquid crystal layer between the substrates, and a pixel electrode in each pixel. The pixel electrode defines: a first stem extending in a first direction, a second stem extending in a second direction, first edge bars extending in the first direction and connected to the second stem, second edge bars extending in the second direction and connected to the first stem, and plural branches extending from the first or second stem and inclined with respect to the first or second directions and terminating spaced apart from the first and second edge bars. Distal ends of each of the first edge bars are spaced apart from distal ends of each of second edge bars, and in the second direction, each of the first edge bars overlaps lines along which the second edge bars respectively lengthwise extend.

20 Claims, 17 Drawing Sheets

LIQUID CRYSTAL DISPLAY DEVICE

This application claims priority to Korean Patent Application No. 10-2015-0128706 filed on Sep. 11, 2015, and all the benefits accruing therefrom under 35 U.S.C. § 119, the content of which in its entirety is herein incorporated by reference.

BACKGROUND

1. Field

The invention relates to a liquid crystal display ("LCD") device.

2. Description of the Related Art

Liquid crystal display (LCD) devices have a wide variety of applications, such as displays for notebook computers, monitors, air crafts, and space crafts because of their numerous advantages such as low operation voltage, low power consumption, portability, and the like.

In general, an LCD device includes an array substrate which displays an image using the optical transmittance of liquid crystal molecules, an opposite substrate which faces the array substrate, and a light assembly which provides light to the array substrate and the opposite substrate. The LCD device also includes pixels, which can render different colors, and may display arbitrary colors using combinations of the colors rendered by the pixels. The pixels may display red ("R"), green ("G"), and blue ("B") colors, and various colors may be displayed using combinations of the R, G and B colors.

Pixel electrodes are provided in the pixels, respectively, and the transmittance of the LCD device varies depending on the structure of the pixel electrodes. Accordingly, a pixel electrode structure capable of improving the transmittance of the LCD device is needed.

SUMMARY

Exemplary embodiments of the invention provide a liquid crystal display ("LCD") device having a pixel electrode structure capable of improving transmittance of the LCD device.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display ("LCD"). The LCD includes first and second substrates facing each other and including a plurality of pixels, a liquid crystal layer interposed between the first and second substrates, and a pixel electrode disposed in each of the pixels on the first substrate. The pixel electrode defines: a first stem thereof which lengthwise extends in a first direction, a second stem thereof which lengthwise extends in a second direction perpendicular to the first direction and intersects the first stem to form a cross shape, first edge bars thereof which lengthwise extend in the first direction and are connected to the second stem, second edge bars thereof which lengthwise extend in the second direction and are connected to the first stem, and a branch thereof provided in plural which lengthwise extends from the first stem or the second stem inclined with respect to the first direction or the second direction and terminates spaced apart from the first and second edge bars. In a top plan view, distal ends of each of the first edge bars are spaced apart from distal ends of each of second edge bars, and in the second direction, each of the first edge bars partially overlaps lines along which the second edge bars respectively lengthwise extend.

According to another exemplary embodiment of the invention, there is provided an LCD. The LCD includes first and second substrates facing each other and including a plurality of pixels, a liquid crystal layer interposed between the first and second substrates, and a pixel electrode disposed in each of the pixels on the first substrate. The pixel electrode defines: a first stem thereof which lengthwise extends in a first direction, a second stem thereof which lengthwise extends in a second direction perpendicular to the first direction and intersects the first stem to form a cross shape, first edge bars thereof which lengthwise extend in the first direction and are connected to the second stem, second edge bars thereof which lengthwise extend in the second direction and are connected to the first stem, a first branch thereof provided in plural which lengthwise extends from the first stem or the second stem inclined with respect to the first direction or the second direction and terminates at a corner of the pixel electrode, and a second branch thereof provided in plural which lengthwise extends from the first stem or the second stem inclined with respect to the first direction or the second direction and terminates spaced apart from the first and second edge bars. In a top plan view, distal ends of each of the first edge bars are spaced apart from distal ends of each of second edge bars, and in the second direction, each of the first branches partially overlaps lines along which the second edge bars respectively lengthwise extend.

According to the exemplary embodiments, an LCD device having the above-described pixel electrode structure has improved transmittance.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
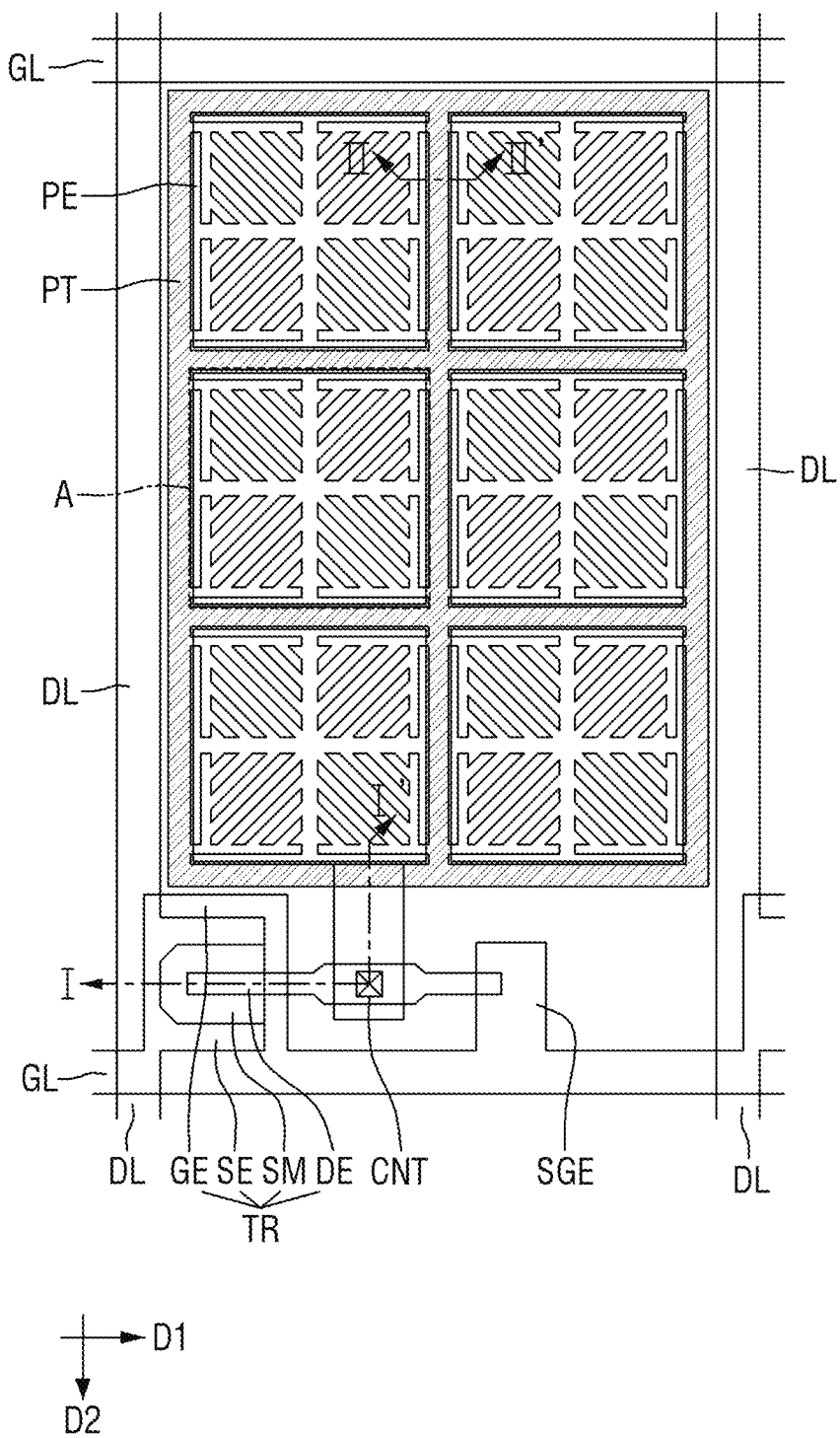
FIG. 1 is a top plan view of an exemplary embodiment of a pixel of a liquid crystal display ("LCD") device according to the invention.

The invention will now be described more fully hereinafter with reference to the accompanying drawings, in which exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element is referred to as being "on" another element, it can be directly on the other element or intervening elements may be present therebetween. In contrast, when an element is referred to as being "directly on" another element, there are no intervening elements present. As used herein, "connected" may include elements are physically and/or electrically connected to each other.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments will hereinafter be described with reference to the accompanying drawings.

Figure 2:
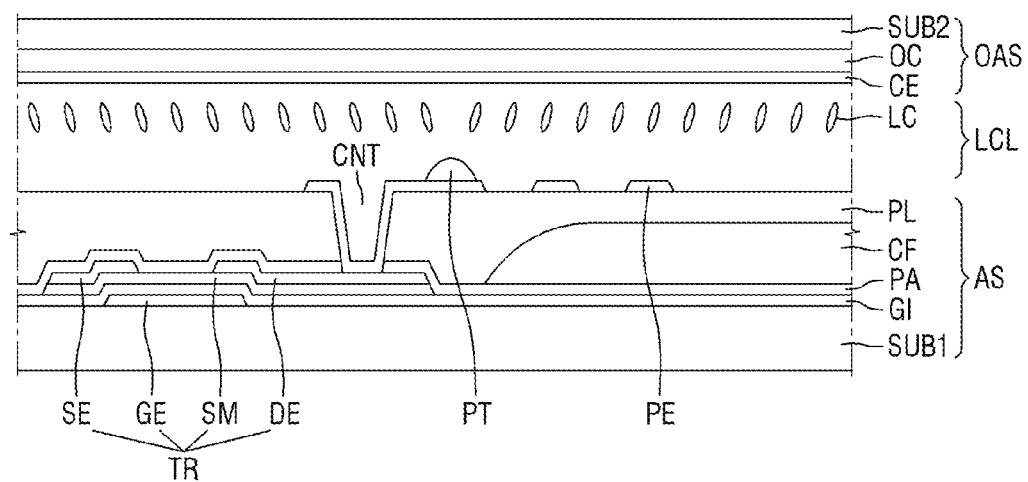
FIG. 2 is a cross-sectional view taken along line I-I' of FIG. 1.
Figure 3:
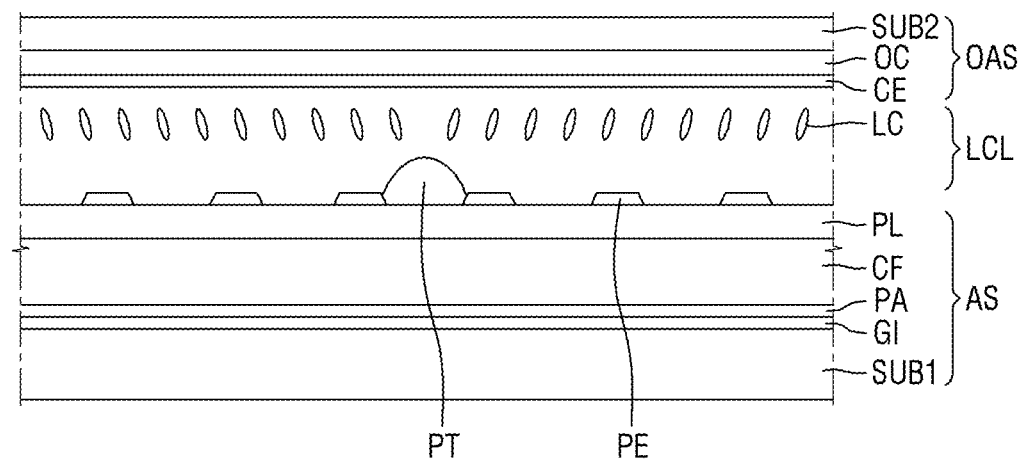
FIG. 3 is a cross-sectional view taken along line II-II' of FIG. 1.
Figure 4:
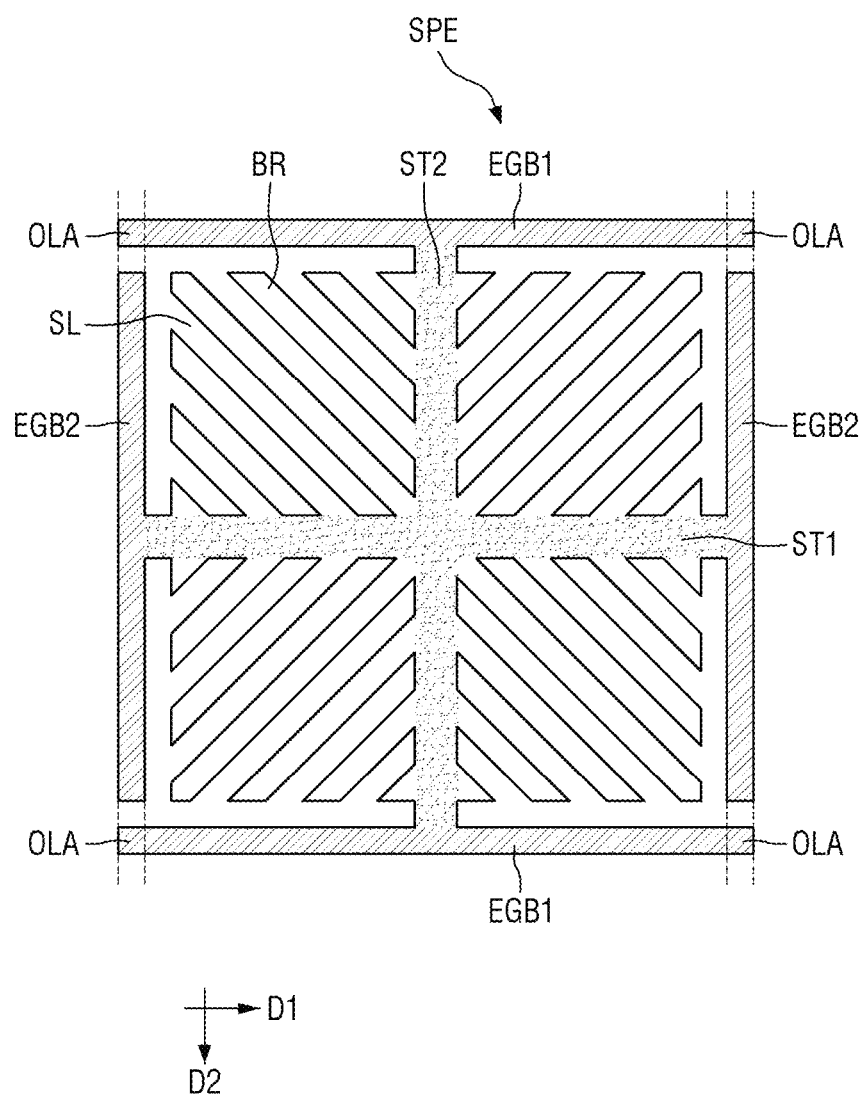
FIG. 4 is an enlarged top plan view of an exemplary embodiment of area A of the LCD device in FIG. 1.

FIG. 1 is a top plan view of an exemplary embodiment of a pixel of a liquid crystal display ("LCD") device according to the invention, FIG. 2 is a cross-sectional view taken along line I-I' of FIG. 1, FIG. 3 is a cross-sectional view taken along line II-II' of FIG. 1, and FIG. 4 is an enlarged top plan view of an exemplary embodiment of area A of the LCD device in FIG. 1. The pixel of the LCD may be provided in plural.

Referring to FIGS. 1 to 4, the LCD device according to the illustrated exemplary embodiment includes an array substrate AS, an opposite substrate OAS, and a liquid crystal layer LCL.

The array substrate AS is a thin-film transistor ("TFT") array substrate on which TFTs TR for driving liquid crystal molecules LC in the liquid crystal layer LCL are disposed, and the opposite substrate OAS may be a display substrate facing the array substrate AS.

The array substrate AS will hereinafter be described.

The array substrate AS includes a first base substrate SUB1. The first substrate SUB1 may be a transparent insulating substrate. In an exemplary embodiment, for example, the first base substrate SUB1 may be a glass substrate, a quartz substrate, a transparent resin substrate, or the like. The first base substrate SUB1 may include a polymer or plastic material with a relatively high thermal resistance. The first base substrate SUB1 may be in the shape of a flat plate, but may be curved in a particular direction. The first base substrate SUB1 may be in a rectangular shape with four sides in a plan view, but may be in a polygonal or circular shape or may have some curved sides in the plan view.

The first base substrate SUB1 may be a flexible substrate. That is, the first base substrate SUB1 may be deformable through rolling, folding or bending.

Gate wiring (GL, GE and SGE), which includes a gate line GL, a gate electrode GE and a sub-gate electrode SGE, is disposed on the first base substrate SUB1. The gate line GL and portions thereof transmit a gate signal and may lengthwise extend in a first direction D1. The gate wiring (GL, GE and SGE) may be provided in plural on the first base substrate SUB1.

The gate wiring (GL, GE and SGE) may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti), or the like. The gate wiring (GL, GE and SGE) may have a single-layer structure or may have a multilayer structure including two conductive films having different physical properties from each other. In the multilayer structure, one of the two conductive films may include or be formed of a relatively low-resistance metal, for example, an Al-based metal, an Ag-based metal, a Cu-based metal, or the like, so as to reduce signal delays or voltage drops in the gate wiring (GL, GE and SGE), and another conductive film may include or be formed of a material with excellent contact properties with respect to indium tin oxide ("ITO") and indium zinc oxide ("IZO"), such as a Mo-based metal, Cr, Ti, Ta, or the like. Examples of the multilayer structure of the gate wiring (GL, GE and SGE) include the combination of a Cr lower film and an Al upper film and the combination of an Al lower film and a Mo upper film, but the invention is not limited thereto. That is, the gate wiring (GL, GE and SGE) may include or be formed using various metals and conductor materials other than those set forth herein.

The gate electrode GE and the sub-gate electrode SGE may each be disposed to protrude from the gate line GL. Portions of the gate line GL may define the gate electrode GE and the sub-gate electrode SGE. The gate line GL, the gate electrode GE and the sub-gate electrode SGE may be in a same layer of the array substrate AS among layers thereof disposed on the first base substrate SUB1.

A gate insulating layer GI is disposed on the gate wiring (GL, GE and SGE). The gate insulating layer GI may include or be formed of an insulating material. In an exemplary embodiment, for example, the gate insulating layer GI may include or be formed of silicon nitride, silicon oxide, silicon oxynitride or a relatively high dielectric constant material. The gate insulating layer GI may have a single-layer structure or may have a multilayer structure including two insulating films having different physical properties from each other.

A semiconductor layer SM is disposed on the gate insulating layer GI. The semiconductor layer SM may be disposed to at least partially overlap the gate electrode GE. The semiconductor layer SM may include amorphous silicon, polycrystalline silicon, or an oxide semiconductor.

Although not specifically illustrated, an ohmic contact member may be further provided on the semiconductor layer SM. The ohmic contact member may include or be formed of n+ hydrogenated amorphous silicon doped with a relatively high concentration of n-type impurities, or silicide. The ohmic contact member may be disposed on the semiconductor layer SM, being paired with another ohmic contact member on the semiconductor layer SM. In response to the semiconductor layer SM including or being formed of an oxide semiconductor, the ohmic contact member may not be provided.

Data wiring (DL and SE) is disposed on the semiconductor layer SM and the gate insulating layer GI. The data wiring (DL and SE) may include a data line DL and a source electrode SE.

The data line DL transmits a data signal. The data line DL may lengthwise extend in a second direction D2, which intersects the first direction D1, and may thus intersect the gate line GL.

The source electrode SE may be branched off, and protrude, from the data line DL. Portions of the data line DL may define the source electrode SE. The drain electrode DE may be spaced apart from the source electrode SE with respect to the gate electrode GE. The data line DL, the source electrode SE and the drain electrode DE may be in a same layer of the array substrate AS among layers thereof disposed on the first base substrate SUB1. The data line DL, the source electrode SE and the drain electrode DE may be provided in plural on the first base substrate SUB1

The source electrode SE and the drain electrode DE spaced apart from each other may partially overlap or contact the semiconductor layer SM or may face each other with the semiconductor layer SM disposed therebetween. A portion of the semiconductor layer SM may be exposed between the spaced apart source and drain electrodes SE and DE. A channel of the TFT TR may be defined by the semiconductor layer SM. At least one of the source electrode SE and the drain electrode DE may be disposed to at least partially overlap the gate electrode GE, but the invention is not limited thereto.

The data wiring (DL and SE) may include or be formed of Al, Cu, Ag, Mo, Cr, Ti, Ta or an alloy thereof. The data wiring (DL and SE) may have a multilayer structure including a lower film formed of a refractory metal and a relatively low-resistance upper film formed on the lower film, but the invention is not limited thereto.

The gate electrode GE, the source electrode SE and the drain electrode DE may form a TFT TR together with the semiconductor layer SM, and the channel of the TFT TR may be defined at the exposed portion of the semiconductor layer SM between the source electrode SE and the drain electrode DE. The TFT TR may be electrically connected to the gate line GL and the data line DL.

The drain electrode DE may be disposed to partially overlap the sub-gate electrode SGE. In response to the first base substrate SUB1 and a second base substrate SUB2 being curved, the drain electrode DE and the gate electrode GE may be misaligned with each other, and the sub-gate electrode SGE which is overlapped by the drain electrode DE may compensate for an error that may be caused by the misalignment of the drain electrode DE and the gate electrode GE.

A passivation layer PA is disposed on the gate insulating layer GI and the TFT TR. The passivation layer PA may include or be formed of an inorganic insulating material and may cover the TFT TR.

A color filter CF is disposed on the passivation layer PA. The color filter CF may allow the transmission of particular wavelength band components of light incident thereupon from the outside of the first base substrate SUB1 while blocking the transmission of other wavelength band components, and may thus allow light emitted to the outside of the second base substrate SUB2 to be tinged with a particular color. The color filter CF may be provided in plural within the LCD.

In an exemplary embodiment, for example, a red color filter which is a type of the color filter CF that makes a red color visible, transmits light in a wavelength band of about 580 nanometers (nm) to about 780 nm therethrough and absorbs (and/or reflects) light in other wavelength bands. A green color filter which is another type of the color filter CF that makes a green color visible, transmits light in a wavelength band of about 450 nm to about 650 nm therethrough and absorbs (and/or reflects) light in other wavelength bands. A blue color filter which is another type of the color filter CF that makes a blue color visible, transmits light in a wavelength band of about 380 nm to about 560 nm therethrough and absorbs (and/or reflects) light in other wavelength bands. The red color filter may include or be formed of a pigment or a photosensitive organic material rendering a red color, the green color filter may include or be formed of a pigment or a photosensitive organic material rendering a green color, and the blue color filter may include or be formed of a pigment or a photosensitive organic material rendering a blue color.

In response to the color filter CF being disposed on the first base substrate SUB1, a misalignment of the color filter CF and a pixel electrode PE can be minimized even if the first and second base substrates SUB1 and SUB2 are both curved. This is because the color filter CF and the pixel electrode PE are both disposed on the first base substrate SUB1. Accordingly, the transmittance of the LCD device may be improved. However, the invention is not limited to the above-described structure. That is, in some exemplary embodiments, the color filter CF may be disposed on the second base substrate SUB2.

Although not specifically illustrated, a light-shielding member may be further provided on the passivation layer PA. The light-shielding member may be disposed to overlap the TFT TR, the data line DL and the gate line GL, and may thus reduce or effectively prevent light leakage that may be caused by a misalignment of the liquid crystal molecules LC, or reduce or effectively prevent the elements disposed on the first base substrate SUB1 from being visible to a user from outside the LCD.

A planarization layer PL is disposed on the color filter CF. The planarization layer PL may planarize the top of the passivation layer PA and may include or be formed of an organic material. In an exemplary embodiment, for example, the planarization layer PL may include or be formed of a photosensitive organic material.

A contact hole CNT which exposes a portion of the TFT TR, and particularly, a portion of the drain electrode DE, is defined extended through the planarization layer PL and the passivation layer PA. The contact hole CNT may serve as a pathway through which the drain electrode DE disposed below the passivation layer PA and elements disposed above the planarization layer PL.

The pixel electrode PE is disposed on the planarization layer PL. A portion of the pixel electrode PE is physically connected to the drain electrode DE at the contact hole CNT and may receive a voltage from the drain electrode DE. The pixel electrode PE may include or be formed of a transparent conductive material such as ITO, IZO, indium tin zinc oxide ("ITZO") or aluminum-doped zinc oxide ("AZO").

The pixel electrode PE may be disposed in each pixel of the LCD. The pixel electrode PE may collectively include a plurality of sub-electrodes SPE. The sub-electrodes SPE may be physically connected to one another, may receive the same voltage and may have the same shape. In the illustrated exemplary embodiment, the pixel electrode PE may collectively include a total of six sub-electrodes SPE, i.e., two arranged in the first direction D1, and three arranged in the second direction D2. However, the invention is not limited thereto. That is, the pixel electrode PE may collectively include more than six sub-electrodes SPE or may include only one sub-electrode SPE.

Each of the sub-electrodes SPE includes a first stem ST1 which lengthwise extends in the first direction D1, a second stem ST2 which lengthwise extends in the second direction D2 and intersects the first stem ST1 to form a cross shape, a branch BR which is provided in plural and which extends from the first stem ST1 or the second stem ST2 inclined (e.g., diagonally) with respect to the first direction D1 or the second direction D2, a first edge bar EGB1, which is provided in plural, extends in the first direction D1 and is connected to the second stem ST2, and a second edge bar EGB2 which is provided in plural, extends in the second direction D2 and is connected to the first stem ST1. The plural first and second edge bars EGB1 and EGB2 are respectively connected to opposing ends of the first and second stems ST1 and ST2. The branches BR extended from the first and second stems ST1 and ST2 terminate at a distance from a respective edge bar. That is, distal ends of the branches BR are spaced apart from the first and second edge bars EGB1 and EGB2.

That is, each of the sub-electrodes SPE may include the first and second stems ST1 and ST2 which are disposed at the center of a corresponding sub-electrode SPE in the shape of a cross, the branches BR which lengthwise extend from the first or second stem ST1 or ST2 inclined with respect to the first or second direction D1 or D2, and the first and second edge bars EGB1 and EGB2 which are connected to the first and second stems ST1 and ST2 and are disposed along the outer sides of the corresponding sub-electrode SPE. Two first edge bars EGB1 and two second edge bars EGB2 may be respectively disposed along four sides of the corresponding sub-electrode SPE, which may be rectangular in planar shape. Distal ends of adjacent first and second edge bars EGB1 and EGB2 are spaced apart from each other.

Since the first and second stems ST1 and ST2 are physically connected to the branches BR, the first edge bars EGB1 and the second edge bars EGB2, the same voltage may be provided throughout the corresponding sub-electrode SPE. The branches BR, the first edge bars EGB1 and the second edge bars EGB2 are spaced from one another, and slits SL which are areas where no transparent conductive material of the sub-electrode SPE is disposed, may be defined in gaps between adjacent branches BR, first edge bars EGB1 and second edge bars EGB2. The branches BR, the first edge bars EGB1 and the second edge bars EGB2 may interact with a common electrode CE to form an electric field, and the liquid crystal molecules LC may be controlled by the electric field.

Each of the first edge bars EGB1 may partially overlap extensions of the second edge bars EGB2 in the second direction D2. That is, as illustrated in FIG. 4, distal ends of each of the first edge bars EGB1 may include overlapping areas OLA in which a corresponding first edge bar EGB1 overlaps a lengthwise extension direction of the second edge bars EGB2 indicated by the dotted line extended from ends of the second edge bars EGB2 in the second direction D2. More specifically, a first side distal end (for example, the right side) of each of the first edge bars EGB1 in the first direction D1 may terminate at or further toward a first side (for example, the right side) in the first direction D1 than second side extension lines (for example, the left sides) of the second edge bars EGB2 in the first direction D1. A second side distal end (for example, the left side) of each of the first edge bars EGB1 in the first direction D1 may terminate at or further toward a second side (for example, the left side) in the first direction than first side extension lines (for example, the right sides) of the second edge bars EGB2.

A region of the sub-electrode SPE may be defined by outer edges of the first and second edge bars EGB1 and EGB2 and virtual extensions extended therefrom. Accordingly, since the first edge bars EGB1, which are portions of the pixel electrode PE, may be disposed at the corners of a rectangular region defined by the corresponding sub-electrode SPE, the transmittance of the LCD device may be improved. The first edge bars EGB1 may define the corners of the sub-electrode SPE and the region defined thereby.

At opposing sides of the sub-electrode SPE, (for example, left and right sides), outer edge of the distal end of the first edge bars EGB1 may be disposed in line (e.g., collinear) with outer lengthwise edges of the second edge bars EGB2 to maximize the transmittance of the LCD device.

A protrusion PT is disposed on the pixel electrode PE. The protrusion PT may have a convex cross-sectional shape, may include or be formed using an organic material, and may surround the outer sides of each of the sub-electrodes SPE in the top plan view.

The protrusion PT may facilitate the control of the alignment direction of the liquid crystal molecules LC. Even in the absence of an electric field, liquid crystal molecules LC on the left side of the protrusion PT may maintain to be tilted to the left, and liquid crystal molecules LC on the right side of the protrusion PT may maintain to be tilted to the right. That is, the liquid crystal molecules LC may be pretilted at a predetermined angle in the absence of an electric field. In response to an electric field being applied to the liquid crystal layer LCL, the liquid crystal molecules LC may be tilted further in the pretilt direction from an initial pretilt direction thereof. Accordingly, the tilting of the liquid crystal molecules LC in a wrong direction (e.g., different than the pretilt direction) may be minimized, and as a result, the transmittance of the LCD device may be improved.

The protrusion PT may further maximize the transmittance of the LCD device by interacting with the first edge bars EGB1 and the second edge bars EGB2 of each of the sub-electrodes SPE. More specifically, two first edge bars EGB1 or two second edge bars EGB2 of adjacent sub-electrodes SPE may be disposed in series, and the liquid crystal molecules LC may be precisely controlled in different directions with respect to the protrusion PT disposed between the two first edge bars EGB1 or the two second edge bars EGB2. Referring to FIG. 1 and FIG. 3, the protrusion PT overlaps each of two adjacent second edge bars EGB2 of adjacent sub-electrodes SPE.

The opposite substrate OAS will hereinafter be described.

The opposite substrate OAS includes a second base substrate SUB2, an overcoat layer OC and the common electrode CE.

The opposite substrate OAS includes the second base substrate SUB2. The second base substrate SUB2 may be a transparent insulating substrate. In an exemplary embodiment, for example, the second base substrate SUB2 may be a glass substrate, a quartz substrate, a transparent resin substrate, or the like. The second base substrate SUB2 may include a polymer or plastic material with relatively high thermal resistance. The first base substrate SUB1 may be in the shape of a flat plate, but may be curved in a particular direction.

In some exemplary embodiments, the second base substrate SUB2 may be a flexible substrate. That is, the second base substrate SUB2 may be deformable through rolling, folding or bending.

The overcoat layer OC is disposed on the second base substrate SUB2. The overcoat layer OC reduces a step difference defined by layers disposed on the second base substrate SUB2. The overcoat layer OC may be omitted.

The common electrode CE is disposed on the overcoat layer OC. The common electrode CE may have the form of a shape with no particular opening patterns. In response to the common electrode CE having no particular opening patterns, the misalignment of the common electrode CE with other elements of the LCD may be reduced or effectively prevented even if the first and second base substrates SUB1 and SUB2 are curved such as from a flat state thereof. Accordingly, any reduction in the transmittance of the LCD device may be minimized.

However, the invention is not limited to this. That is, the common electrode CE may include particular opening patterns defined therein. In response to the common electrode CE having particular opening patterns, the control of the direction of an electric field formed by the common electrode CE and the pixel electrode PE which is disposed to face the common electrode CE, may be facilitated, and as a result the control of the alignment direction of the liquid crystal molecules LC may be facilitated.

The common electrode CE may include or be formed of a transparent conductive material such as ITO, IZO, ITZO, AZO, or the like.

The liquid crystal layer LCL will hereinafter be described.

The liquid crystal layer LCL includes the liquid crystal molecules LC, which have dielectric anisotropy. The liquid crystal molecules LC may be vertical alignment ("VA")-type liquid crystal molecules LC aligned between the array substrate AS and the opposite substrate OAS in a vertical direction with respect to both the array substrate AS and the opposite substrate OAS. In response to an electric field being applied between the array substrate AS and the opposite substrate OAS, the liquid crystal molecules LC may be tilted with a particular slope between the array substrate AS and the opposite substrate OAS according to the intensity of the electric field, and may thus either allow or block the transmission of light.

Figure 5:
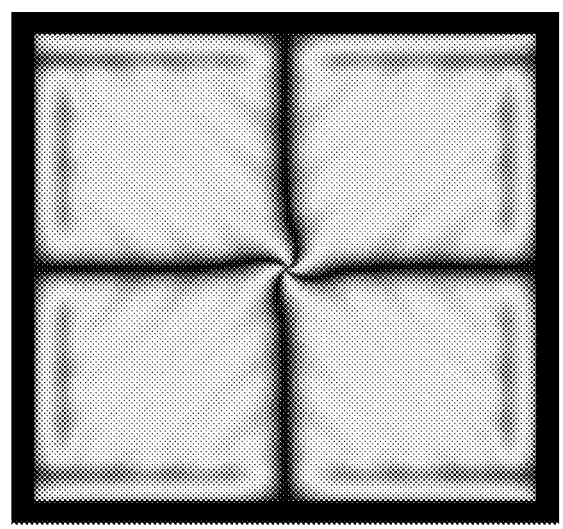
FIG. 5 is a photograph showing emission of light from area A of FIG. 4.
Figure 6:
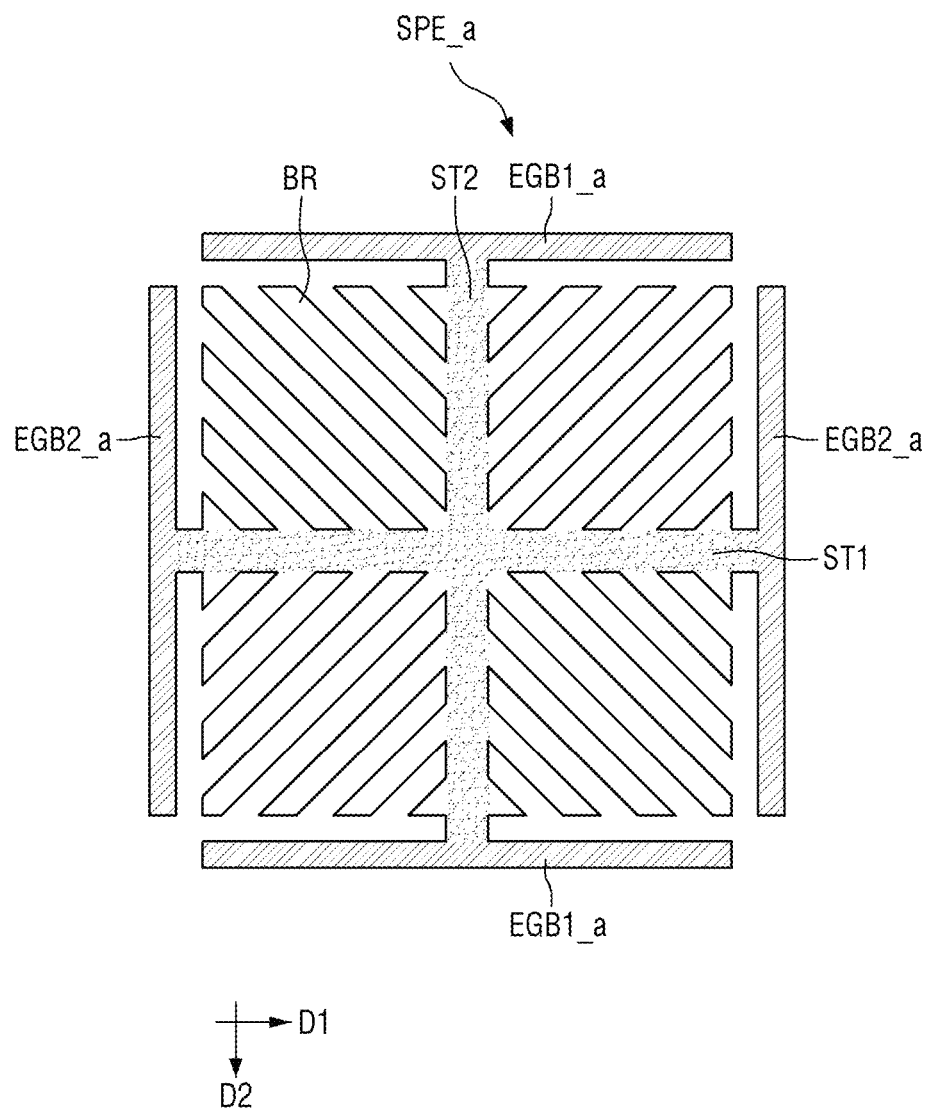
FIG. 6 is an enlarged top plan view of another exemplary embodiment of area A of the LCD device in FIG. 1 according to the invention.
Figure 7:
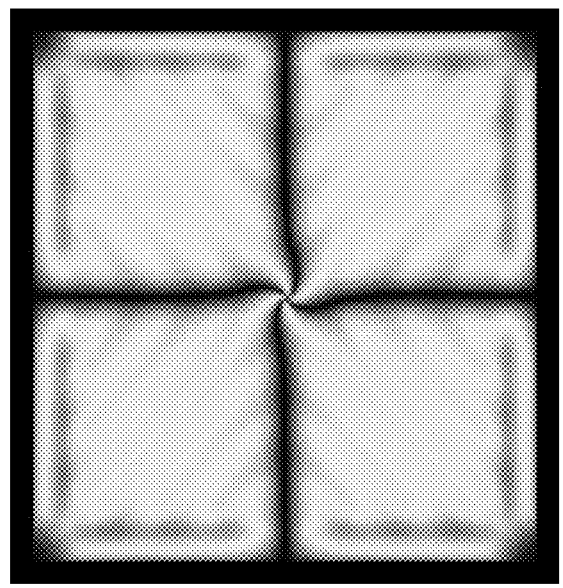
FIG. 7 is a photograph showing emission of light from area A of FIG. 6.

FIG. 5 is a photograph showing emission of light from area A of the LCD device in FIG. 4, FIG. 6 is an enlarged top plan view of another exemplary embodiment of area A of the LCD device in FIG. 1 according to the invention, and FIG. 7 is a photograph showing emission of light from area A of FIG. 6.

In FIGS. 1 to 7, like reference numerals denote like elements, and thus, detailed descriptions thereof will be omitted.

Referring to FIGS. 4 and 6, in a sub-electrode SPE_a of FIG. 6, unlike in the sub-electrode SPE in FIG. 4, there are no overlapping areas (OLA in FIG. 4) in which each of first edge bars EGB1_a overlaps virtual extensions of second edge bars EGB2_a lengthwise extended in a second direction D2. The length of the first edge bars EGB1_a in a first direction D1 may be shorter than a distance between the second edge bars EGB2_a in the first direction D1. That is, at the corners of the region defined by edges of the sub-electrode SPE_a, neither the first nor the second edge bar EGB1_a and EGB2_a is disposed.

Referring to FIG. 5, a considerable amount of light is transmitted through the sub-electrode SPE at the corners of the region where the sub-electrode SPE is disposed and the sub-electrode SPE shines relatively bright at the corners thereof. Referring to FIG. 7, the amount of light transmitted through the sub-electrode SPE_a of FIG. 6 at the corners of a region where the sub-electrode SPE_a is disposed may be relatively small, and the sub-electrode SPE_a of FIG. 6 may be relatively dark at the corners thereof. That is, in response to the first edge bars EGB1 being formed to extend relatively long as in the sub-electrode SPE of FIG. 4, the amount of light transmitted through the region where the sub-electrode SPE is disposed may relatively increase, and thus, the optical transmittance of the whole LCD device may be improved.

Figure 8:
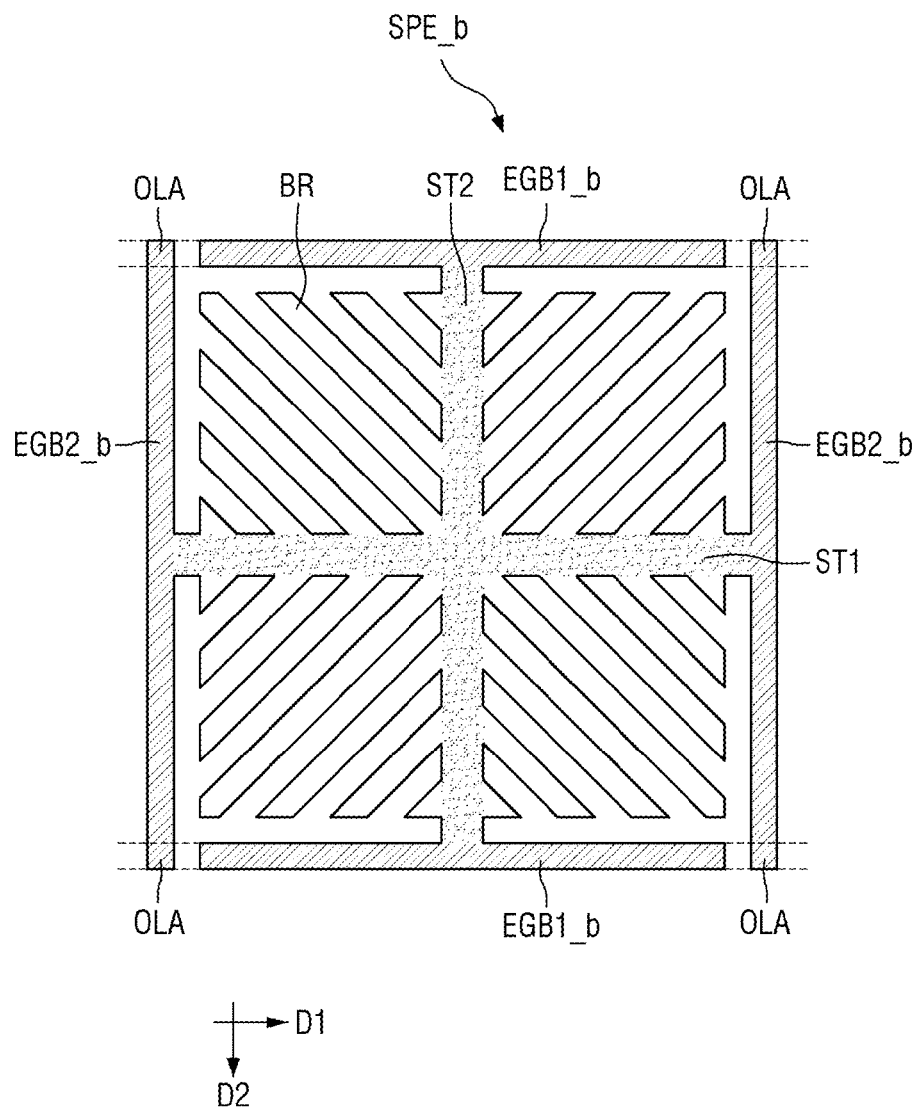
FIG. 8 is an enlarged top plan view of still another exemplary embodiment of area A of the LCD device in FIG. 1 according to the invention.
Figure 9:
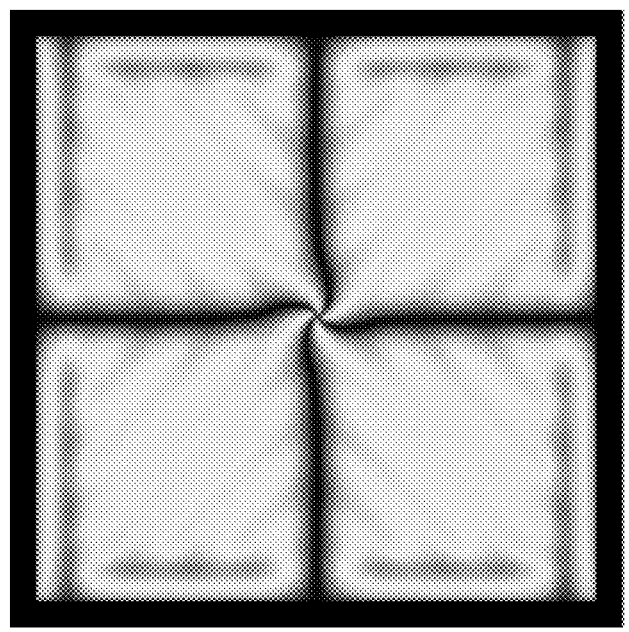
FIG. 9 is a photograph showing emission of light from area A of FIG. 8.

FIG. 8 is an enlarged top plan view of still another exemplary embodiment of area A of the LCD device in FIG. 1 according to the invention, and FIG. 9 is a photograph showing emission of light from area A of FIG. 8.

Referring to FIGS. 8 and 9, each of second edge bars EGB2_b may partially overlap virtual extension lines (dotted lines) of the first edge bars EGB1_b in a first direction D1. More specifically, each of the second edge bars EGB2_b may include overlapping areas OLA at which a corresponding second edge bar EGB2_b overlaps the virtual extensions of the first edge bars EGB1_b in the first direction D1.

That is, in a sub-electrode SPE_b of FIG. 8, each of the second edge bars EGB2_b has the overlapping areas OLA, whereas in the sub-electrode SPE of FIG. 4, each of the first edge bars EGB1 has the overlapping areas OLA.

Referring to FIG. 9, a considerable amount of light is transmitted at the corners of a region defined by edges of the sub-electrode SPE_b, and the optical transmittance of an LCD device can be further improved.

Figure 10:
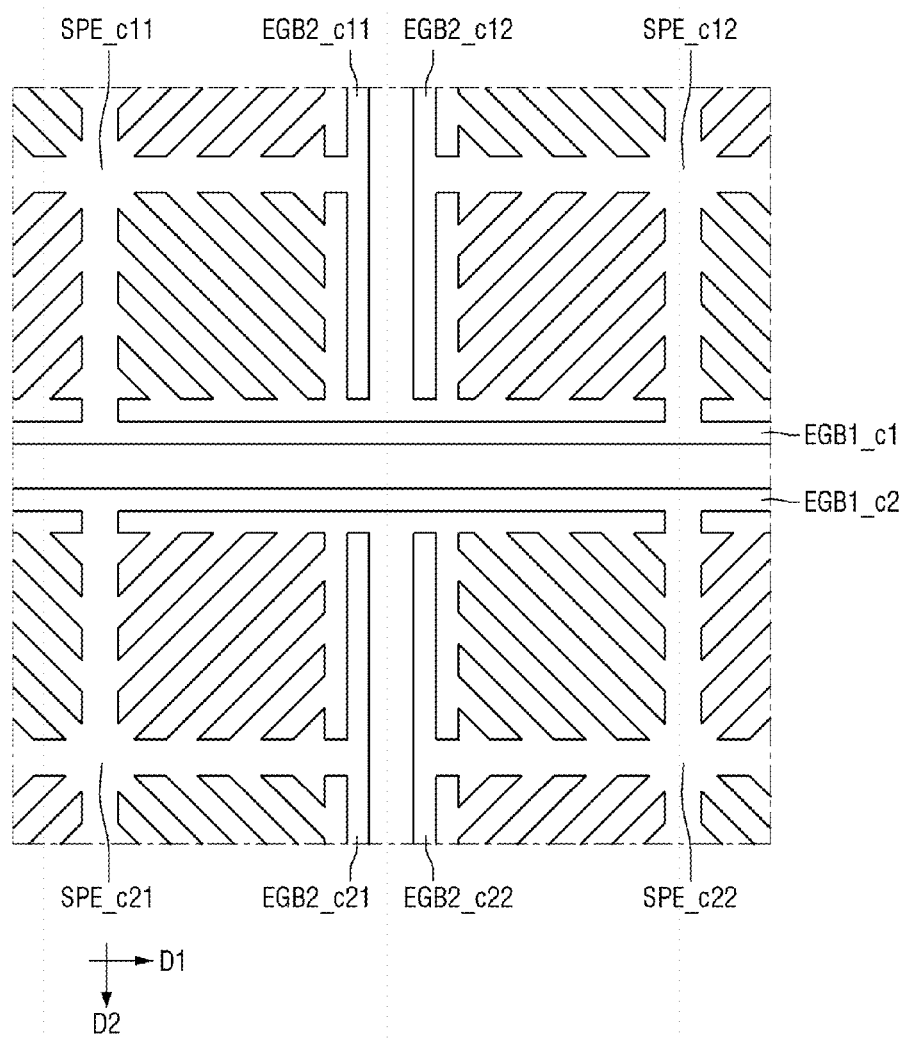
FIG. 10 is an enlarged top plan view of portion of an exemplary embodiment of a pixel electrode of an LCD device according to the invention.
Figure 11:
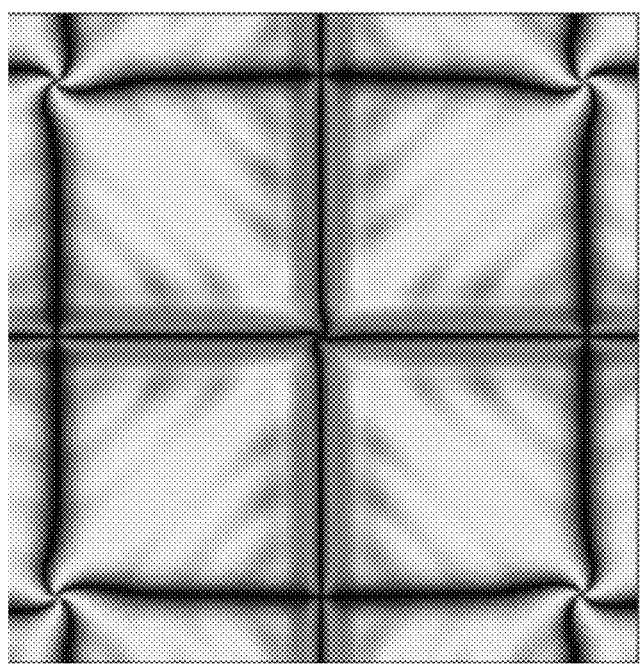
FIG. 11 is a photograph showing emission of light from the portion of the pixel electrode of FIG. 10.
Figure 12:
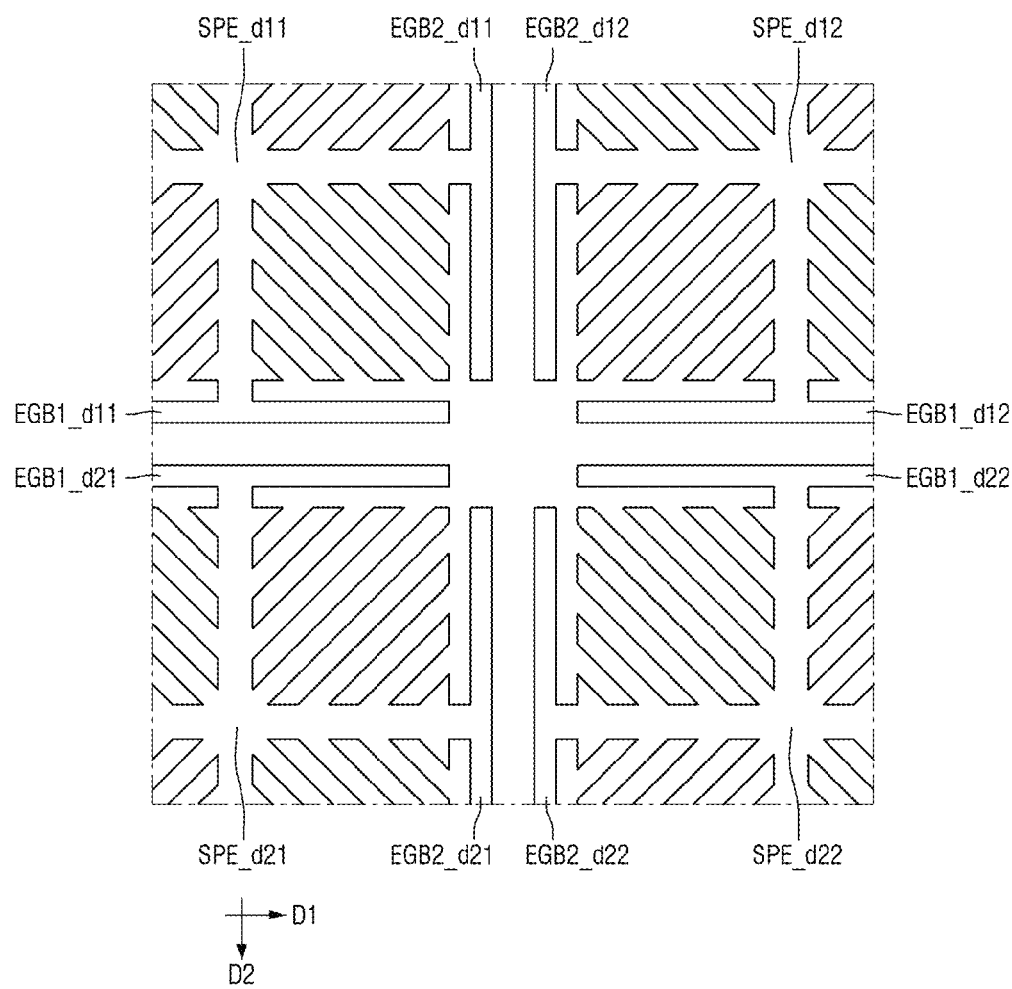
FIG. 12 is an enlarged top plan view of portion of another exemplary embodiment of a pixel electrode of an LCD device according to the invention.
Figure 13:
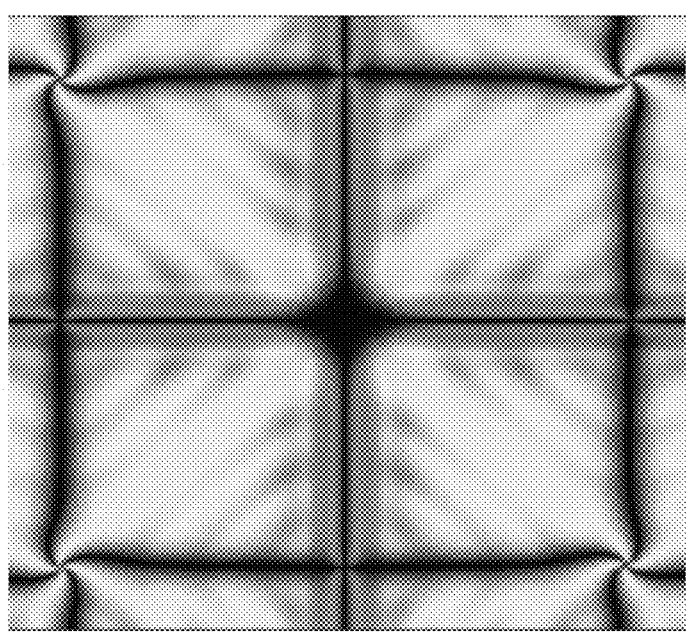
FIG. 13 is a photograph showing emission of light from the portion of the pixel electrode of FIG. 12.

FIG. 10 is an enlarged top plan view of a portion of an exemplary embodiment of a pixel electrode of an LCD device according to the invention, FIG. 11 is a photograph showing emission of light from the portion of the pixel electrode of FIG. 10, FIG. 12 is an enlarged top plan view of another exemplary embodiment of a portion of a pixel electrode of an LCD device according to the invention, and FIG. 13 is a photograph showing emission of light from the portion of the pixel electrode of FIG. 12.

More specifically, FIGS. 10 and 11 illustrate a pixel electrode PE in which four sub-electrodes SPE_c11, SPE_c12, SPE_c21, and SPE_c22 adjacent to each other are arranged in a matrix.

Referring to FIGS. 10 and 11, first edge bars of the sub-electrodes SPE_c11 and SPE_c12, which are adjacent to each other in a first direction D1, are connected to each other to define first edge bar EGB1_c1, and first edge bars of the sub-electrodes SPE_c21 and SPE_c22, which are adjacent to each other in the first direction D1, are connected to each other to define first edge bars EGB1_c2. Accordingly, liquid crystal molecules LC disposed at or near the center defined among the four sub-pixels SPE_c11, SPE_c12, SPE_c21, and SPE_c22, which are arranged in a matrix, are controlled by the first edge bar EGB1_c1 and the first edge bar EGB1_c2, and thus, the transmittance of a LCD device may be improved.

Referring to FIGS. 11 and 12, first edge bars EGB1_d11 and EGB1_d12 of sub-electrodes SPE_d11 and SPE_d12, which are adjacent to each other in a first direction D1, are not connected (e.g., distal ends thereof are spaced apart from each other in the first direction D1), and first edge bars EGB1_d21 and EGB1_d22 of sub-electrodes SPE_d21 and SPE_d22, which are adjacent to each other in the first direction D1, are not connected (e.g., distal ends thereof are spaced apart from each other in the first direction D1). As a result, the force of controlling liquid crystal molecules LC disposed at or near the center defined among the four sub-pixel electrodes SPE_d11, SPE_d12, SPE_d21, and SPE_d22, which are arranged in a matrix, may be relatively weak, and thus, a dark area may be formed at the center among the sub-pixel electrodes SPE_d11, SPE_d12, SPE_d21, and SPE_d2, as shown in FIG. 12.

That is, the pixel electrode PE of FIG. 10 may further improve the transmittance of an LCD device.

The invention is not particularly limited to the exemplary embodiment in which the first edge bars of the sub-electrodes SPE_c11 and SPE_c12, which are adjacent to each other in the first direction D1, are connected to each other to define first edge bar EGB1_c1 and first edge bars of the sub-electrodes SPE_c21 and SPE_c22, which are adjacent to each other in the first direction D1, are connected to each other to define first edge bar EGB1_c2. That is, the second edge bars of a pair of adjacent sub-electrodes SPE in a second direction D2 may also be connected to each other. That is, second edge bars EGB2_c11 and EGB2_c21 may be connected to each other to define a single continuous second edge bar, and second edge bars EGB2_c12 and EGB2_c22 may be connected to each other to define a single continuous second edge bar.

Referring again to FIGS. 11 and 12, second edge bars EGB2_d11 and EGB2_d21 which are adjacent to each other in a second direction D2, are not connected (e.g., distal ends thereof are spaced apart from each other in the second direction D2), and second edge bars EGB2_d12 and EGB2_d22 which are adjacent to each other in the second direction D2, are not connected (e.g., distal ends thereof are spaced apart from each other in the second direction D2). As a result, the force of controlling liquid crystal molecules LC disposed at or near the center defined among the four sub-pixel electrodes SPE_d11, SPE_d12, SPE_d21, and SPE_d22, which are arranged in a matrix, may be relatively weak, and thus, a dark area may be formed at the center among the sub-pixel electrodes SPE_d11, SPE_d12, SPE_d21, and SPE_d2, as shown in FIG. 12.

Figure 14:
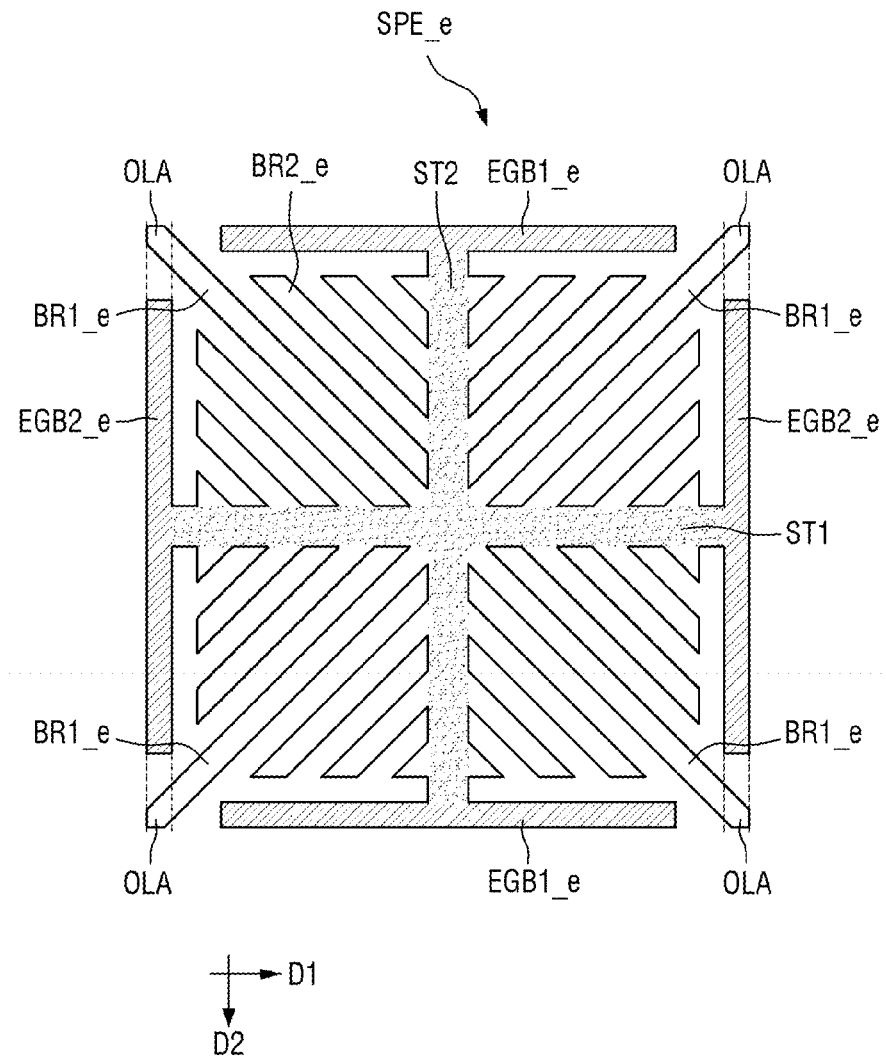
FIG. 14 is an enlarged top plan view of yet another exemplary embodiment of area A of the LCD device in FIG. 1 according to the invention.
Figure 15:
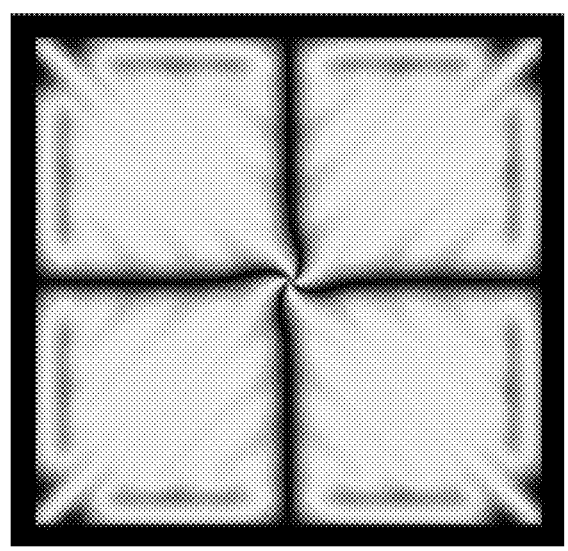
FIG. 15 is a photograph showing emission of light from area A of FIG. 14.

FIG. 14 is an enlarged top plan view of yet another exemplary embodiment of area A of the LCD device in FIG. 1 according to the invention, and FIG. 15 is a photograph showing emission of light from area A of FIG. 14.

Referring to FIG. 14, a sub-electrode SPE_e includes a first stem ST1 which lengthwise extends in a first direction D1, a second stem ST2 which lengthwise extends in a second direction D2 and intersects the first stem ST1 to form a cross shape, a first branch BR1_e provided in plural and a second branch BR2_e provided in plural each lengthwise extending the first stem ST1 or the second stem ST2, a first edge bar EGB1_e provided in plural, lengthwise extending in the first direction D1 and connected to the second stem ST2, and a second edge bar EGB2_e provided in plural, lengthwise extending in the second direction D2 and connected to the first stem ST1.

The first branches BR1_e may respectively extend toward the four corners of a rectangular region defined by edges of the sub-electrode SPE_e. Distal ends of the first branches BR1_e terminate at the corners of the rectangular region and may define the edges of the sub-electrode SPE_e at the corners.

Each of the first branches BR1_e may partially overlap a virtual extension (dotted lines) of one of the second edge bars EGB2_e in the second direction D2. That is, as illustrated in FIG. 14, each of the first branches BR1_e may include an overlapping area OLA in which a distal end of a corresponding first branch BR1_e overlaps the virtual extension of one of the second edge bars EGB2_e in the second direction D2.

Accordingly, the length of the first branches BR1_e may be longer than the length of a second branch BR2_e closest to a corresponding first branch BR1_e. Each of the first branches BR1_e may also partially overlap a virtual extension of one of the first edge bars EGB1_e in the first direction D1.

Outer edges of the first branches BR1_e are defined extended in the lengthwise direction thereof. Distal ends of the first and second edge bars EGB1_e and EGB2_e define edges thereof which are non-parallel with the outer edges of the first branches BR1_e. That is, the distal end edges of the first and second edge bars EGB1_e and EGB2_e may be perpendicular with the lengthwise edges thereof.

Since the first branches BR1_e, which are portions of a pixel electrode PE, may be disposed at and define the corners of the rectangular region in which the corresponding sub-electrode SPE_e is disposed, the transmittance of the LCD device may be improved.

Referring to FIG. 15, a considerable amount of light is transmitted through the sub-electrode SPE_e at the corners of the region where the sub-electrode SPE_e is disposed, and the sub-electrode SPE_e, unlike the sub-electrode SPE of FIG. 4, shines bright at the corners thereof. Accordingly, the transmittance of an LCD device may be improved.

Figure 16:
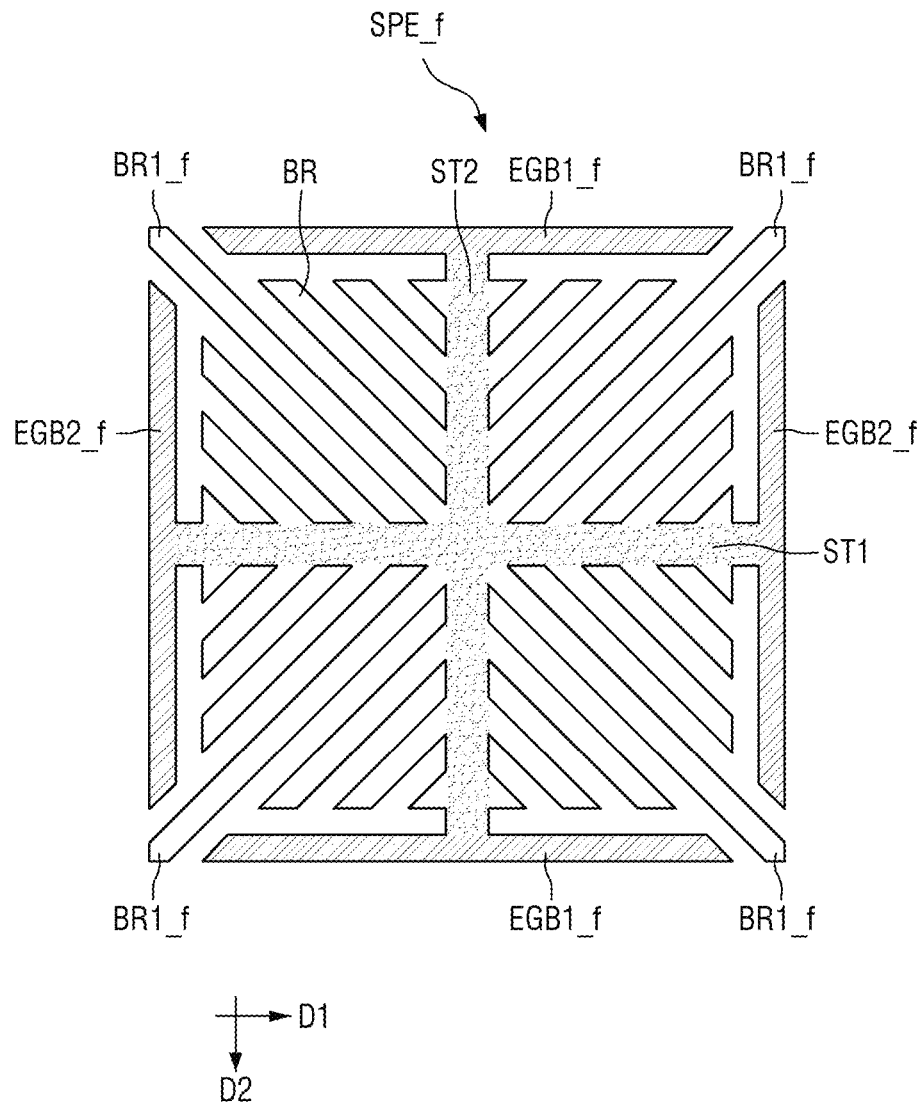
FIG. 16 is an enlarged top plan view of yet another exemplary embodiment of area A of the LCD device in FIG. 1 according to the invention.
Figure 17:
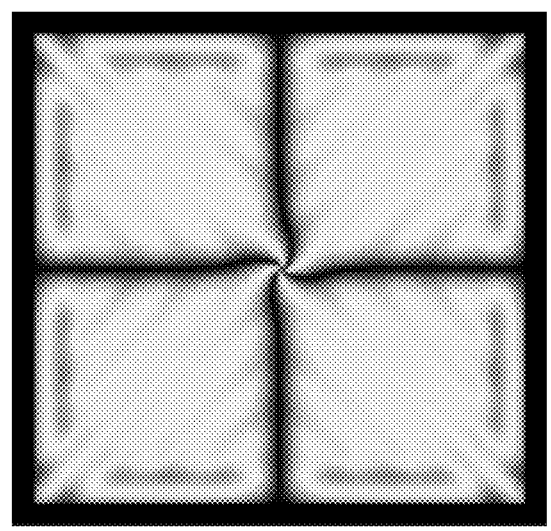
FIG. 17 is a photograph showing emission of light from area A of FIG. 16.

FIG. 16 is an enlarged top plan view of yet another exemplary embodiment of area A of the LCD in FIG. 1 according to the invention, and FIG. 17 is a photograph showing emission of light from area A of FIG. 16.

Referring to FIG. 16, distal ends (for example, the left and right ends) of each of first edge bars EGB1_f in a first direction D1 may define edges parallel to a direction in which outer edges of the first branches BR1_f most adjacent to a corresponding first edge bar EGB1_f extend. Accordingly, gaps between the distal ends of each of the first edge bars EGB1_f in the first direction D1 and the first branches BR1_f most adjacent to the corresponding first edge bar EGB1_f may be minimized, and may be uniformly maintained. Thus, the transmittance of a sub-pixel SPE_f may be improved at or near the sides of each of the first edge bars EGB1_f in the first direction D1.

Second edge bars EGB2_f may have substantially the same shape as the first edge bars EGB1_f. That is, distal ends (for example, the top and bottom ends) of each of the second edge bars EGB2_f in a second direction D2 may define edges parallel to a direction in which outer edges of the first branches BR1_f most adjacent to a corresponding second edge bar EGB2_f extend. Accordingly, gaps between the distal ends of each of the second edge bars EGB2_f in the second direction D2 and the first branches BR1_f most adjacent to the corresponding second edge bar EGB2_f may be minimized, and may be uniformly maintained. Thus, the transmittance of the sub-pixel SPE_f may be improved at or near the sides of each of the second edge bars EGB2_f in the second direction D2.

Referring to FIG. 17, in the sub-electrode SPE_f, a considerable amount of light is transmitted at or near the sides of each of the first edge bars EGB1_f in the first direction D1 and the sides of each of the second edge bars EGB2_f in the second direction D2, and the sub-electrode SPE_f can improve the optical transmittance of an LCD device.

However, the effects of the invention are not restricted to the one set forth herein. The above and other effects of the invention will become more apparent to one of daily skill in the art to which the invention pertains by referencing the claims.

What is claimed is:

1. A liquid crystal display device, comprising:
   first and second substrates facing each other and including a plurality of pixels;
   a liquid crystal layer interposed between the first and second substrates; and
   a pixel electrode disposed in each of the pixels on the first substrate,
   wherein the pixel electrode defines:
      a first stem thereof which lengthwise extends in a first direction,
      a second stem thereof which lengthwise extends in a second direction perpendicular to the first direction and intersects the first stem to form a cross shape,
      first edge bars thereof which lengthwise extend in the first direction and are connected to the second stem,
      second edge bars thereof which lengthwise extend in the second direction and are connected to the first stem, and
      a branch thereof provided in plural which lengthwise extends from the first stem or the second stem inclined with respect to the first direction or the second direction and terminates spaced apart from the first and second edge bars,
   wherein in a top plan view,
      distal ends of each of the first edge bars are spaced apart from distal ends of each of second edge bars, and
      in the second direction, each of the first edge bars partially overlaps lines along which the second edge bars respectively lengthwise extend.

2. The liquid crystal display device of claim 1, wherein a distal end of a first edge bar is disposed collinear with outer edges of the second edge bars, in the first direction.

3. The liquid crystal display device of claim 1, wherein the first edge bars are respectively connected to opposing distal ends of the second stem, and
   the second edge bars are respectively connected to opposing distal ends of the first stem.

4. The liquid crystal display device of claim 3, wherein in the second direction, opposing distal ends of each of the first edge bars partially overlap the lines along which the second edge bars respectively extend, and
   the overlapping distal ends of the first edge bars define overlapping areas at opposing first and second sides of the pixel electrode in the first direction.

5. The liquid crystal display device of claim 1, further comprising:
   a protrusion disposed in each of the pixels on the first substrate to surround outer sides of the pixel electrode.

6. The liquid crystal display device of claim 1, further comprising:

a color filter disposed between the first substrate and the pixel electrode.

7. A liquid crystal display device, comprising:
first and second substrates facing each other and including a plurality of pixels;
a liquid crystal layer interposed between the first and second substrates; and
a pixel electrode disposed in each of the pixels on the first substrate, the pixel electrode including a sub-electrode which is provided in plural connected to one another, each of the sub-electrodes defining
a first stem thereof which lengthwise extends in a first direction,
a second stem thereof which lengthwise extends in a second direction perpendicular to the first direction and intersects the first stem to form a cross shape,
first edge bars thereof which lengthwise extend in the first direction and are connected to the second stem,
second edge bars thereof which lengthwise extend in the second direction and are connected to the first stem, and
a branch thereof provided in plural which lengthwise extends from the first stem or the second stem inclined with respect to the first direction or the second direction and terminates spaced apart from the first and second edge bars,
wherein in a top plan view,
distal ends of each of the first edge bars are spaced apart from distal ends of each of second edge bars, and
in the second direction, each of the first edge bars partially overlaps lines along which the second edge bars respectively lengthwise extend.

8. The liquid crystal display device of claim 7, wherein a distal end of a first edge bar is disposed collinear with an outer edges of the second edge bars, in the first direction.

9. The liquid crystal display device of claim 7, wherein
the first edge bars are respectively connected to opposing distal ends of the second stem, and
the second edge bars are respectively connected to opposing distal ends of the first stem.

10. The liquid crystal display device of claim 9, wherein in the second direction, opposing distal ends of each of the first edge bars partially overlap the lines along which the second edge bars respectively lengthwise extend, and
the overlapping distal ends of the first edge bars define overlapping areas at opposing first and second sides of the sub-electrode in the first direction.

11. The liquid crystal display device of claim 7, further comprising:
a protrusion disposed in each of the pixels on the first substrate to surround outer sides of each of the sub-electrodes.

12. The liquid crystal display device of claim 7, further comprising:
a color filter disposed between the first substrate and the pixel electrode.

13. The liquid crystal display device of claim 7, wherein first edge bars of a pair of sub-electrodes adjacent in the first direction are connected to each other.

14. The liquid crystal display device of claim 7, wherein second edge bars of a pair of sub-electrodes adjacent in the second direction are connected to each other.

15. A liquid crystal display device, comprising:
first and second substrates facing each other and including a plurality of pixels;
a liquid crystal layer interposed between the first and second substrates; and
a pixel electrode disposed in each of the pixels on the first substrate,
wherein the pixel electrode defines:
a first stem thereof which lengthwise extends in a first direction,
a second stem thereof which lengthwise extends in a second direction perpendicular to the first direction and intersects the first stem to form a cross shape,
first edge bars thereof which lengthwise extend in the first direction and are connected to the second stem,
second edge bars thereof which lengthwise extend in the second direction and are connected to the first stem,
a first branch thereof provided in plural which lengthwise extends from the first stem or the second stem inclined with respect to the first direction or the second direction and terminates at a corner of the pixel electrode, and
a second branch thereof provided in plural which lengthwise extends from the first stem or the second stem inclined with respect to the first direction or the second direction and terminates spaced apart from the first and second edge bars,
wherein in a top plan view,
distal ends of each of the first edge bars are spaced apart from distal ends of each of second edge bars, and
in the second direction, each of the first branches partially overlaps lines along which the second edge bars respectively lengthwise extend.

16. The liquid crystal display device of claim 15, wherein a length of each of the first branches is longer than a length of second branches directly adjacent to a corresponding first branch.

17. The liquid crystal display device of claim 15, wherein distal ends of each of the first edge bars are disposed parallel to a direction in which first branches adjacent to a corresponding first edge bar lengthwise extend.

18. The liquid crystal display device of claim 17, wherein distal ends each of the second edge bars are disposed parallel to a direction in which first branches adjacent to a corresponding second edge bar lengthwise extend.

19. The liquid crystal display device of claim 15, further comprising:
a protrusion disposed in each of the pixels on the first substrate to surround outer sides of the pixel electrode.

20. The liquid crystal display device of claim 15, further comprising:
a color filter disposed between the first substrate and the pixel electrode.

* * * * *